US 12,307,155 B2

(12) United States Patent
Chen et al.

(10) Patent No.: US 12,307,155 B2
(45) Date of Patent: May 20, 2025

(54) ELECTRONIC DEVICE AND FRAME SHARING METHOD USING THE SAME

(71) Applicant: Acer Incorporated, New Taipei (TW)

(72) Inventors: Kuan-Ju Chen, New Taipei (TW);
Hung-Ming Chang, New Taipei (TW);
Chao-Kuang Yang, New Taipei (TW)

(73) Assignee: ACER INCORPORATED, New Taipei (TW)

( * ) Notice: Subject to any disclaimer, the term of this patent is extended or adjusted under 35 U.S.C. 154(b) by 148 days.

(21) Appl. No.: 18/220,957

(22) Filed: Jul. 12, 2023

(65) Prior Publication Data

US 2024/0020082 A1  Jan. 18, 2024

(30) Foreign Application Priority Data

Jul. 12, 2022 (TW) .................................. 111126095

(51) Int. Cl.
*G06F 3/14* (2006.01)
*G06F 3/01* (2006.01)

(52) U.S. Cl.
CPC ............ *G06F 3/1454* (2013.01); *G06F 3/013* (2013.01); *G06F 3/1423* (2013.01)

(58) Field of Classification Search
CPC ....... G06F 3/013; G06F 3/1423; G06F 3/1454
See application file for complete search history.

(56) References Cited

U.S. PATENT DOCUMENTS

| 9,489,165 | B2* | 11/2016 | Wright ................. G06F 3/01 |
| 11,700,137 | B2* | 7/2023 | Gross ................. H04L 65/70 |
| | | | 709/227 |
| 2005/0253775 | A1 | 11/2005 | Stewart |
| 2009/0102744 | A1 | 4/2009 | Ram |
| 2016/0077685 | A1 | 3/2016 | Fang et al. |

FOREIGN PATENT DOCUMENTS

| CN | 105577819 A | 5/2016 |
| CN | 106453358 A | 2/2017 |
| CN | 106453538 A | 2/2017 |
| CN | 111045772 A | 4/2020 |
| CN | 112463097 A | 3/2021 |
| CN | 112860208 A | 5/2021 |
| CN | 113835663 A | 12/2021 |
| TW | 200834417 A | 8/2008 |
| TW | 201530427 A | 8/2015 |
| TW | 201601060 A | 1/2016 |
| TW | 201602909 A | 1/2016 |

* cited by examiner

*Primary Examiner* — Michael Pervan
(74) *Attorney, Agent, or Firm* — Birch, Stewart, Kolasch & Birch, LLP (57) ABSTRACT

An electronic device including a working screen, a sharing screen and a processor is provided. The processor is electrically connected to the working screen and the sharing screen and is configured to: create a virtual desktop of the working screen; assign the virtual desktop to the sharing screen; executes an application; and share the virtual desktop containing a window frame of the application to a remote computer device or share the window frame itself to the remote computer device.

20 Claims, 6 Drawing Sheets

ELECTRONIC DEVICE AND FRAME SHARING METHOD USING THE SAME

This application claims the benefit of Taiwan application Serial No. 111126095, filed Jul. 12, 2022, the subject matter of which is incorporated herein by reference.

BACKGROUND OF THE INVENTION

Field of the Invention

The invention relates in general to an electronic device and a frame sharing method using the same.

Description of the Related Art

Normally, application can be installed on an electronic device. After the application is executed, the user will be able to enjoy the functions provided by the application. However, other electronic devices not installed with the application cannot use the functions of the application. Therefore, it has become a prominent task for the industry to allow an electronic device to share an application installed therein to other electronic devices not installed with the application.

SUMMARY OF THE INVENTION

The present invention is directed to an electronic device and a frame sharing method using the same capable of resolving the problems encountered in the prior art.

According to one embodiment of the present invention, an electronic device is provided. The electronic device includes a working screen, a sharing screen and a processor. The processor is electrically connected to the working screen and the sharing screen and is configured to: create a virtual desktop of the working screen; assign the virtual desktop to the sharing screen; execute an application; and share the virtual desktop containing a window frame of the application to a remote computer device or share the window frame itself to the remote computer device.

According to another embodiment of the present invention, an electronic device is provided. The electronic device includes a screen and a processor. The processor is electrically connected to the working screen and the sharing screen and is configured to: create a virtual desktop of the working screen; assign the virtual desktop to the sharing screen; execute an application; and share the virtual desktop containing a window frame of the application to a remote computer device or share the window frame itself to the remote computer device.

According to an alternate embodiment of the present invention, a frame sharing method is provided. The frame sharing method is adaptable to an electronic device. The electronic device includes a working screen, a sharing screen and a processor. The frame sharing method includes the following steps: creating a virtual desktop of a working screen by the processor; assigning the virtual desktop to the sharing screen by the processor; executing the application by the processor; and, sharing the virtual desktop containing a window frame of the application to a remote computer device or sharing the window frame itself to the remote computer device by the processor.

According to another alternate embodiment of the present invention, a frame sharing method is provided. The frame sharing method is adaptable to an electronic device. The electronic device includes a screen and a processor. The frame sharing method includes the following steps: creating a virtual desktop of a screen by the processor; executing an application by the processor; and sharing the virtual desktop containing a window frame of the application to a remote computer device or sharing the window frame itself to the remote computer device by the processor.

The above and other aspects of the invention will become better understood with regard to the following detailed description of the preferred but non-limiting embodiment (s). The following description is made with reference to the accompanying drawings.

DETAILED DESCRIPTION OF THE INVENTION

Figure 1A:
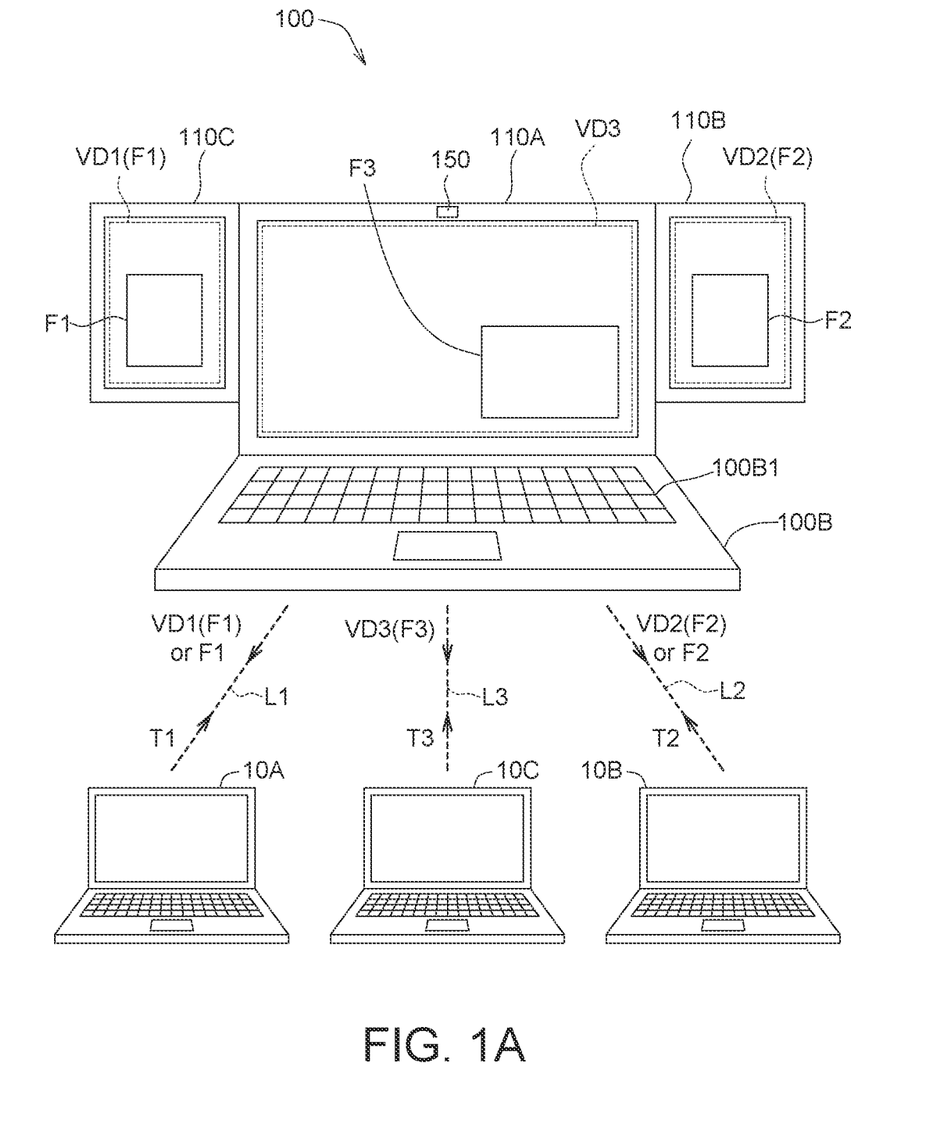
FIG. 1A is a schematic diagram of frame sharing between an electronic device and at least one remote computer device according to an embodiment of the present invention.
Figure 1B:
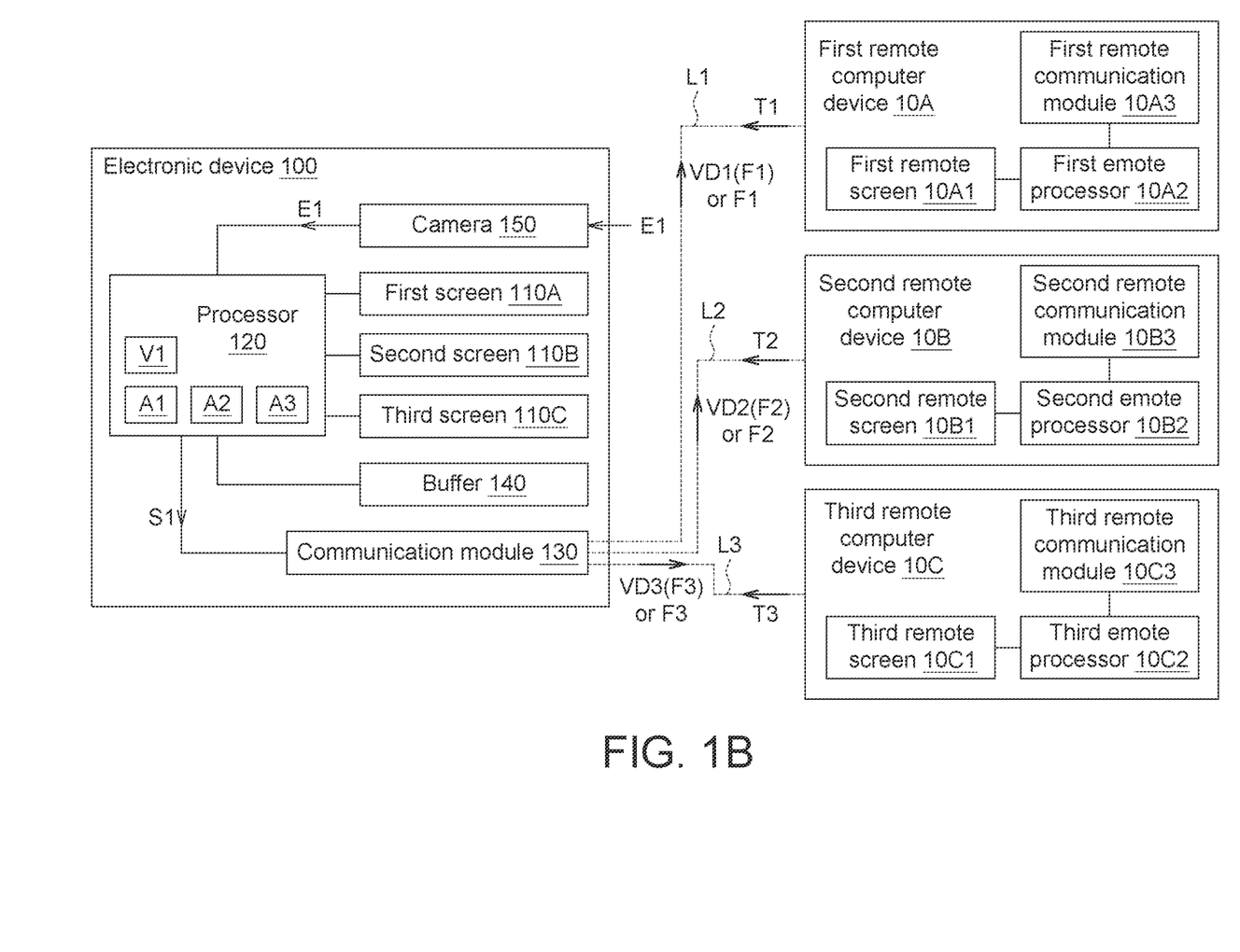
FIG. 1B is a functional block diagram of the electronic device and remote computer device of FIG. 1A.

Refer to FIGS. 1A to 1B. FIG. 1A is a schematic diagram of frame sharing between an electronic device 100 and at least one remote computer device according to an embodiment of the present invention. FIG. 1B is a functional block diagram of the electronic device 100 and remote computer device of FIG. 1A.

The electronic device 100 can be realized by a notebook computer, but the said exemplification is not for limiting the embodiments of the present invention.

As indicated in FIGS. 1A to 1B, the electronic device 100 includes a first screen 110A, a second screen 110B, a third screen 110C, a processor 120, a communication module 130, a buffer 140 and a camera 150. The electronic device 100 further includes a host 100B, a processor 120 and/or a communication module 130 which can be arranged on the host 100B. The host 100B further includes an input keyboard 100B1, which can accept a user command. In the present embodiment, the host 100B is pivotally connected to one side of the first screen 110A; the second screen 110B and the third screen 110C are pivotally connected to two opposite sides of the first screen 110A, respectively. However, the said arrangement is not for limiting the embodiments of the present invention. In another embodiment, the second screen 110B and the third screen 110C can be independent of the first screen 110A. For instance, the first screen 110A, the processor 120, the communication module 130, the buffer 140 and/or the camera 150 can be assembled to form a device, such as a notebook computer, a desktop computer or other suitable electronic devices. The sharing screen and the device are separate but can communicate with each other through a physical transmission line or wireless communication technology.

The processor 120, the buffer 140 and/or the communication module 130 can be realized by physical circuits formed by semiconductor manufacturing process. Specifically, the processor 120 can be realized by such as central processing unit (CPU), a graphics processing unit (GPU) or other relevant processors. The communication module 130 can be realized by a wireless communication module which supports wireless communication protocols. The buffer 140 can be realized by such as a memory.

As indicated in FIGS. 1A to 1B, the processor 120 is electrically connected to the first screen 110A (such as the working screen) and the second screen 110B (such as the sharing screen) and is configured to: create a virtual desktop of the first screen 110A; assign the virtual desktop to the second screen 110B; execute an application, and, share the virtual desktop containing a window frame of the application to the remote computer device or share the window frame itself to the remote computer device. In the present embodiment, since the virtual desktop is assigned to the second screen 110B and does not occupy the display area of the first screen 110A, the user's operation of the first screen 110A is not affected. Besides, given that the virtual desktop is already assigned to the second screen 110B, if the user wants to operate the virtual desktop, the user only needs to deal with the second screen 110B without having to deal with the first screen 110A, and there is no need to change the display frame of the first screen 110A. Moreover, based on the sharing technology provided in the embodiments of the present invention, the remote computer device can use the application installed in the electronic device 100 without having to install the said application.

In the present embodiment as indicated in FIGS. 1A to 1B, the electronic device 100 uses the first screen 110A as the working screen and uses the screen (second screen 110B and third screen 110C) other than the working screen as the sharing screen. In the present embodiment, the number of screens is exemplified by three. However, the present invention does not specify the number of screens, and there can be four or more than four screens.

Refer to FIGS. 1A to 1B. Take the frame sharing between the first remote computer device 10A and the electronic device 100 for instance. First, a first link L1 between the first remote computer device 10A and the communication module 130 is created. The first remote computer device 10A transmits a frame sharing command T1 to the processor 120 through the first link L1. In response to the frame sharing command T1, the processor 120 executes the following steps: creating a first virtual desktop VD1, assigning the first virtual desktop VD1 to the second screen 110B, executing the first application A1 and sharing the first virtual desktop VD1 containing the first window frame F1 of the first application A1 to the first remote computer device 10A or sharing the first window frame F1 itself to the first remote computer device 10A. After assigning the first virtual desktop VD1 to the second screen 110B, the processor 120 can minimize the first window frame F1 of the second screen 110B, so that the first window frame F1 will not occupy the display area of the first virtual desktop VD1 of the second screen 110B.

In the present specification, "execute the application" refers to executing the application in response to a user command. The user command is generated through the user's input to the input keyboard 100B1 or the user's operation of a mouse connected to the host 100B.

In the example of sharing the first virtual desktop VD1 to the first remote computer device 10A, the first remote screen 10A1 of the first remote computer device 10A displays the entire frame of the virtual desktop, including the first window frame F1 (when the window frame F1 is not minimized) and the frame of the virtual desktop not covered by the first window frame F1. In the example of sharing the first window frame F1 itself to the first remote computer device 10A, the first remote screen 10A1 of the first remote computer device 10A displays the first window frame F1 itself but excludes the frame of the virtual desktop not covered by the first window frame F1. Also, the frame sharing command T1 can carry message such as "share the first virtual desktop VD1" or "share the first window frame F1 itself"; the processor 120 can determine whether to execute "share the first virtual desktop VD1" or "share the first window frame F1 itself" according to the frame sharing command T1. Moreover, the frame sharing module (not illustrated) of the processor 120 can implement "share the first virtual desktop VD1", and the window frame sharing module (not illustrated) of the processor 120 can implement "share the first window frame F1 itself". The frame sharing module and the window frame sharing module can be realized by programs or physical circuits formed by the semiconductor manufacturing process and can be included in the graphics processing unit.

As indicated in FIGS. 1A to 1B, the first remote computer device 10A includes a first remote screen 10A1, a first remote processor 10A2 and a first remote communication module 10A3. The first remote screen 10A1 can display the first virtual desktop VD1. The said first link L1 can be created by the first remote communication module 10A3 of the first remote computer device 10A and the communication module 130 of the electronic device 100. The first remote processor 10A2 is electrically connected to the first remote communication module 10A3 and the first remote screen 10A1 to control these elements. In another embodiment, the first remote computer device 10A can be realized by an independent screen such as the first remote screen 10A1. In the present example, the first remote computer device 10A can be realized by a display screen or an advertisement screen.

Refer to FIGS. 1A to 1B. Take the frame sharing between the second remote computer device 10B and the electronic device 100 for instance. First, a second link L2 between the second remote computer device 10B and the communication module 130 is created. The second remote computer device 10B transmits a frame sharing command T2 to the processor 120 through the second link 12. In response to the frame sharing command T2, the processor 120 executes the following steps: creating a second virtual desktop VD2, assigning the second virtual desktop VD2 to the third screen 110C, executing the second application A2 and sharing the second virtual desktop VD2 containing a second window frame F2 of the second application A2 to the second remote computer device 10B or sharing the second window frame F2 itself to the second remote computer device 10B. After assigning the second virtual desktop VD2 to the third screen 110C, the processor 120 can minimize the second window frame F2 of the third screen 110C, so that the second window frame F2 does not occupy the display area of the second virtual desktop VD2 of the third screen 110C.

As indicated in FIGS. 1A to 1B, the second remote computer device 10B includes a second remote screen 10B1, a second remote processor 10B2 and a second remote communication module 10B3. The second remote screen 10B1 can display the second virtual desktop VD2. The second link L2 can be created by the second remote communication module 10B3 of the second remote computer device 10B and the communication module 130 of the electronic device 100. The second remote processor 10B2 is electrically connected to the second remote communication module 10B3 and the second remote screen 10B1 to control these elements. In another embodiment, the second remote computer device 10B can be realized by an independent screen such as the second remote screen 10B. In the present example, the second remote computer device 10B can be realized by a display screen or an advertisement screen.

The remaining frame sharing technologies between the remote computer device and the electronic device 100 are similar to or identical to the frame sharing technology between the remote computer device (10A or 10B) and the electronic device 100, and the similarities are not repeated here. Besides, the number of remote computer devices that can receive the sharing screen depends on the upper limit of the number of virtual desktops created by the electronic device 100 and is not subjected to specific restrictions in the embodiments of the present invention.

Moreover, the sharing screen is prioritized in the execution of frame sharing, and the working screen is used to execute frame sharing only when all sharing screens are assigned to share screen. For instance, the processor 120 is further configured to: determine whether each sharing screen is already assigned with a corresponding virtual desktop; if each sharing screen is already assigned with corresponding virtual desktop, create a virtual desktop of the working screen; executes an application, wherein the window frame of the application is displayed on the working screen; and, share the virtual desktop of the working screen containing the window frame to the remote computer device or share the window frame itself to the remote computer device.

For instance, when receiving a frame sharing command T3 from a third remote computer device 10C, the processor 120 determines whether the second screen 110B and the third screen 110C (all sharing screens) both are already assigned with a corresponding virtual desktop; if the second screen 110B and the third screen 110C both are already assigned with a corresponding virtual desktop (that is, all sharing screens are executing frame sharing), creates a third virtual desktop VD3 on the first screen 110A (working screen); executes a third application A3, wherein the third window frame F3 of the third application A3 is displayed on the first screen 110A; and, shares the third virtual desktop VD3 of the first screen 110A containing the third window frame F3 to the third remote computer device 10C or shares the third window frame F3 itself to the third remote computer device 10C.

In an embodiment, the processor 120 is further configured to: determine whether the number of created virtual desktops has reached an upper limit; and, if the number of created virtual desktops has reached the upper limit, output a full-load signal to the remote computer device. For instance, when receiving a frame sharing command from other remote computer devices, the processor 120 determines whether the number of created virtual desktops has reached the upper limit; and, if the number of created virtual desktops has reached the upper limit, the processor 120 generates a full-load signal S1 and transmits the full-load signal S1 to a corresponding remote computer device through the communication module 130 to inform the remote computer device of the message "no more frame sharing".

Examples of the first application A1, the second application A2 and the third application A3 disclosed above include game software, drawing software, word processing software. Two of the above applications can be identical to or different from each other. Besides, the processor 120 must have a high processing speed capable of executing several applications at the same time. Since the applications are mainly executed by the processor 120, the processing speed of the first remote processor 10A2 can be lower than the processing speed of the processor 120. Similarly, the processing speed of the second remote processor 10B2 can be lower than the processing speed of the processor 120.

In an embodiment, the processor 120 can firstly create a virtual desktop of the working screen then execute an application. Meanwhile, the window frame of the application is displayed on the working screen. Then, the processor 120 assigns the virtual desktop containing the window frame from the working screen to the sharing screen. In another embodiment, the processor 120 can firstly create a virtual desktop of the working screen then assign the virtual desktop from the working screen to the sharing screen. Then, the processor 120 executes an application on the virtual desktop of the sharing screen. Meanwhile, the window frame of the application is displayed on the sharing screen. In other embodiments, the processor 120 can firstly create a virtual desktop of the working screen then assign the virtual desktop from the working screen to the sharing screen. Then, the processor 120 executes an application on the desktop of the working screen. Meanwhile, the window frame of the application is displayed on the working screen. Then, the processor 120 assigns the window frame from the working screen to the virtual desktop of the sharing screen.

As indicated in FIG. 1B. The electronic device 100 further includes a buffer 150 electrically connected to the processor 120. The processor 120 can store the previous image of the streaming video of the window frame to the buffer 150, obtain the difference between the next window frame F1 and the previous window frame F1 through comparison, encode the difference, and transmit the encoded next window frame to the remote computer device. Since the contents of the encoded next window frame are compressed, transmission burden can be decreased, and transmission time can be reduced.

As indicated in FIG. 1B. The electronic device 100 further includes a camera 150. The camera 150 is assigned to one of the first screen 110A, the second screen 110B and the third screen 110C and is electrically connected to the processor 120. The camera 150 is configured to capture an eye frame E1 of an eye (or eyes) of a user. The processor 120 is further configured to: analyze the eye frame E1 to determine a gaze V1 of the user's eye, and use the screen attended by the gaze V1 as the working screen. For instance, the user is viewing the first screen 110A, the camera 150 captures the corresponding eye frame E1, the processor 120 analyzes the eye frame E1 to obtain the gaze V1 of the user's eye, uses the first screen 110A attended by the gaze V1 as the working screen and uses remaining screens as sharing screens. Using similar methods, the processor 120 can use the second screen 110B attended by the gaze V1 as the working screen or use the third screen 110C attended by the gaze V1 as the working screen.

Figure 2A:
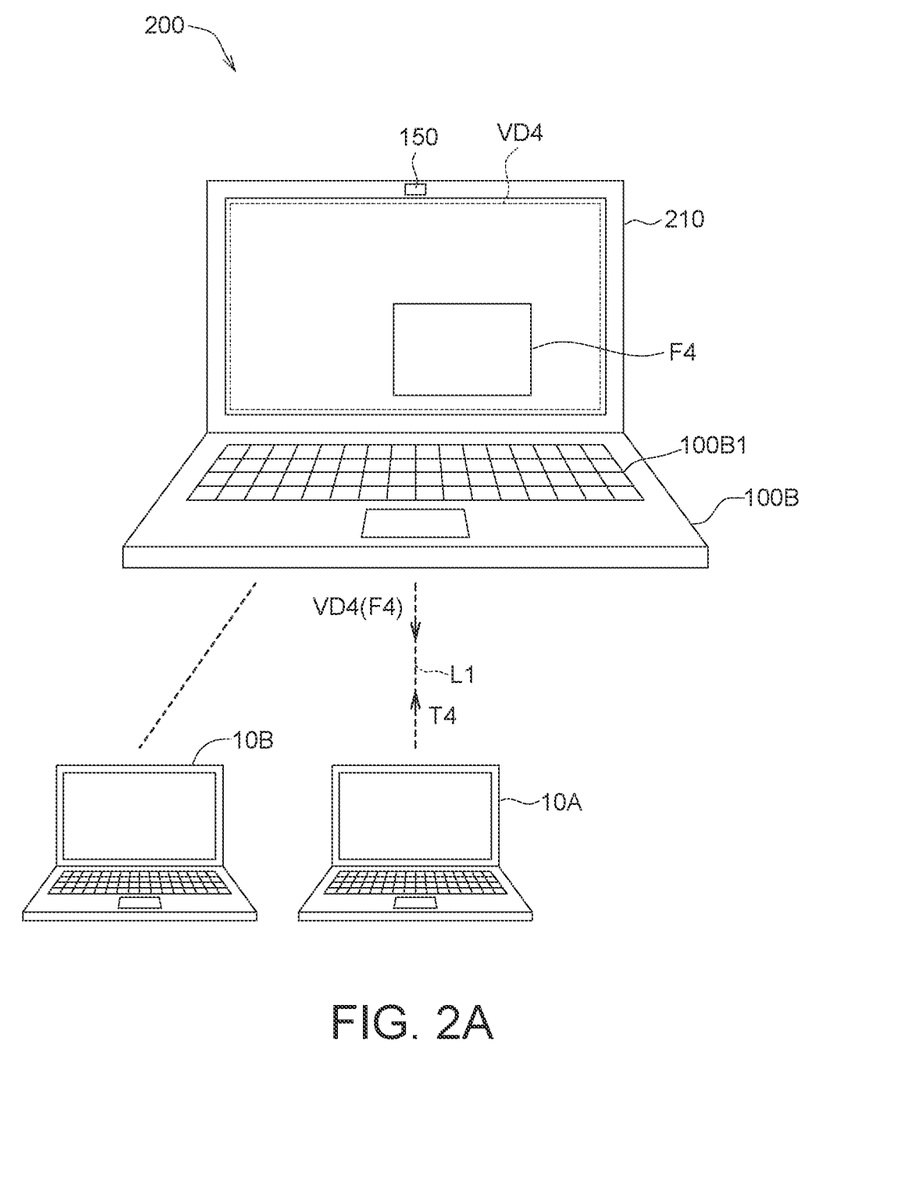
FIG. 2A is a schematic diagram of frame sharing between an electronic device and at least one remote computer device according to the present invention another embodiment.
Figure 2B:
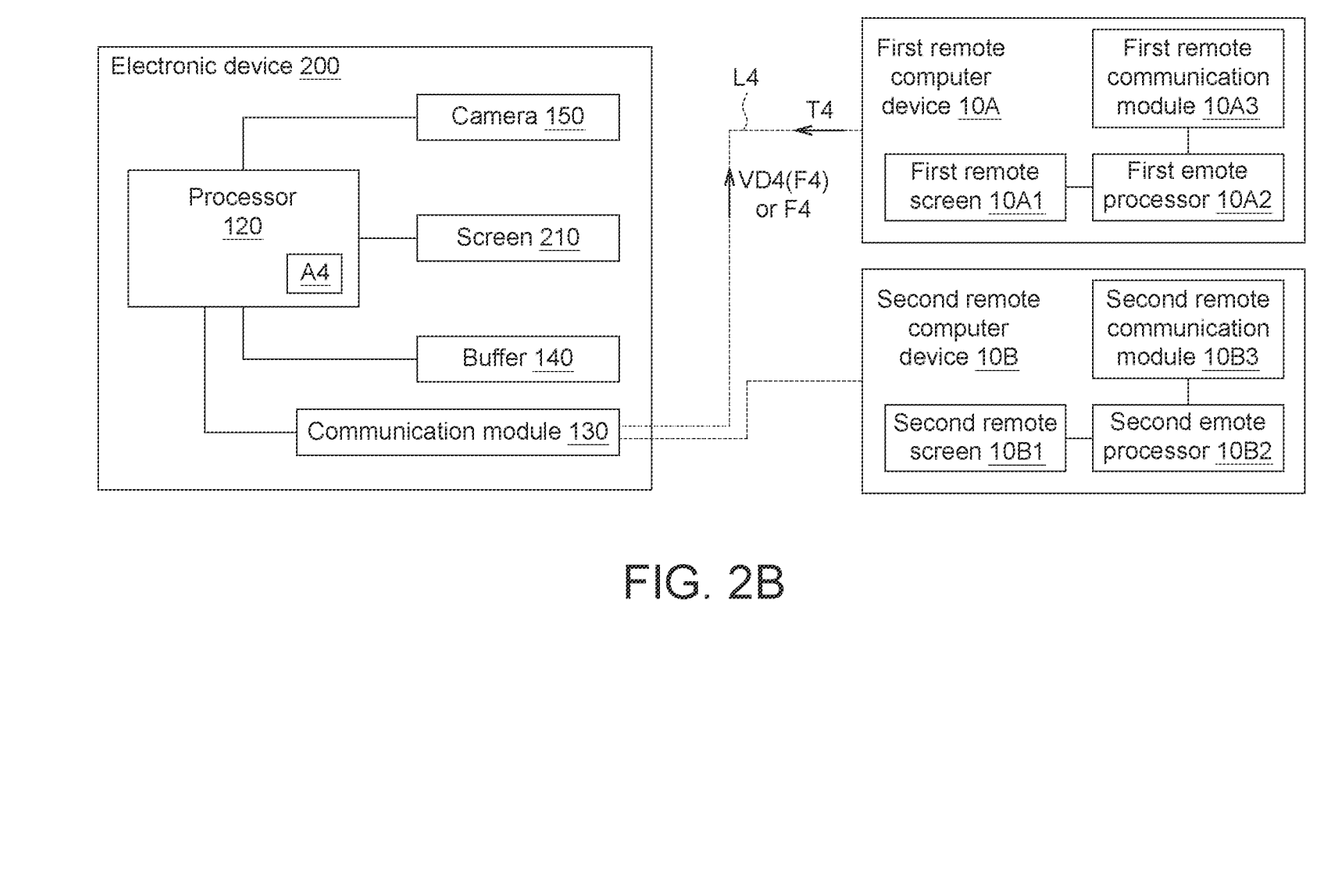
FIG. 2B is a functional block diagram of the electronic device and remote computer device of FIG. 2A.

Refer to FIG. 2A to 2B. FIG. 2A is a schematic diagram of frame sharing between an electronic device 200 and at least one remote computer device according to the present invention another embodiment. FIG. 2B is a functional block diagram of the electronic device 200 and remote computer device of FIG. 2A.

The electronic device 200 can be realized by such as a notebook computer. The electronic device 200 includes a screen 210, a processor 120, a communication module 130, a buffer 140 and a camera 150 (optional). The electronic device 100 and the electronic device 200 of the present invention have similar or identical technical features but are different in that the electronic device 200 has only one screen.

The processor 120 is electrically connected to the screen 210 and is configured to: create a virtual desktop of the screen 210; execute an application, and, share the virtual desktop containing a window frame of the application to the remote computer device or share the window frame itself to the remote computer device. Based on the sharing technology of the present invention, an application can be shared to the remote computer device not installed with the application.

Take the frame sharing between the first remote computer device 10A and the electronic device 100 for instance. First, a first link L4 between the first remote computer device 10A and the communication module 130 is created. The first remote computer device 10A transmits a frame sharing command T4 to the processor 120 through the first link L4. In response to the frame sharing command T4, the processor 120 executes the following steps: creating a virtual desktop VD4 of the screen 210, executing an application A4 and sharing the virtual desktop VD4 containing a window frame F4 of the application A4 to the first remote computer device 10A or sharing the window frame F4 itself to the first remote computer device 10A. Additionally, after sharing the virtual desktop VD4 containing the window frame F4 of the application A4 to the first remote computer device 10A or sharing the window frame F4 itself to the first remote computer device 10A, the processor 120 minimizes the window frame F4, so that the window frame F4 does not occupy the display area of the virtual desktop VD4 of the screen 210.

The frame sharing technology between the second remote computer device 10B and other remote computer devices and the electronic device 100 is similar to or identical to the frame sharing technology between the first remote computer device 10A and the electronic device 100, and the similarities are not repeated here.

Figure 3:
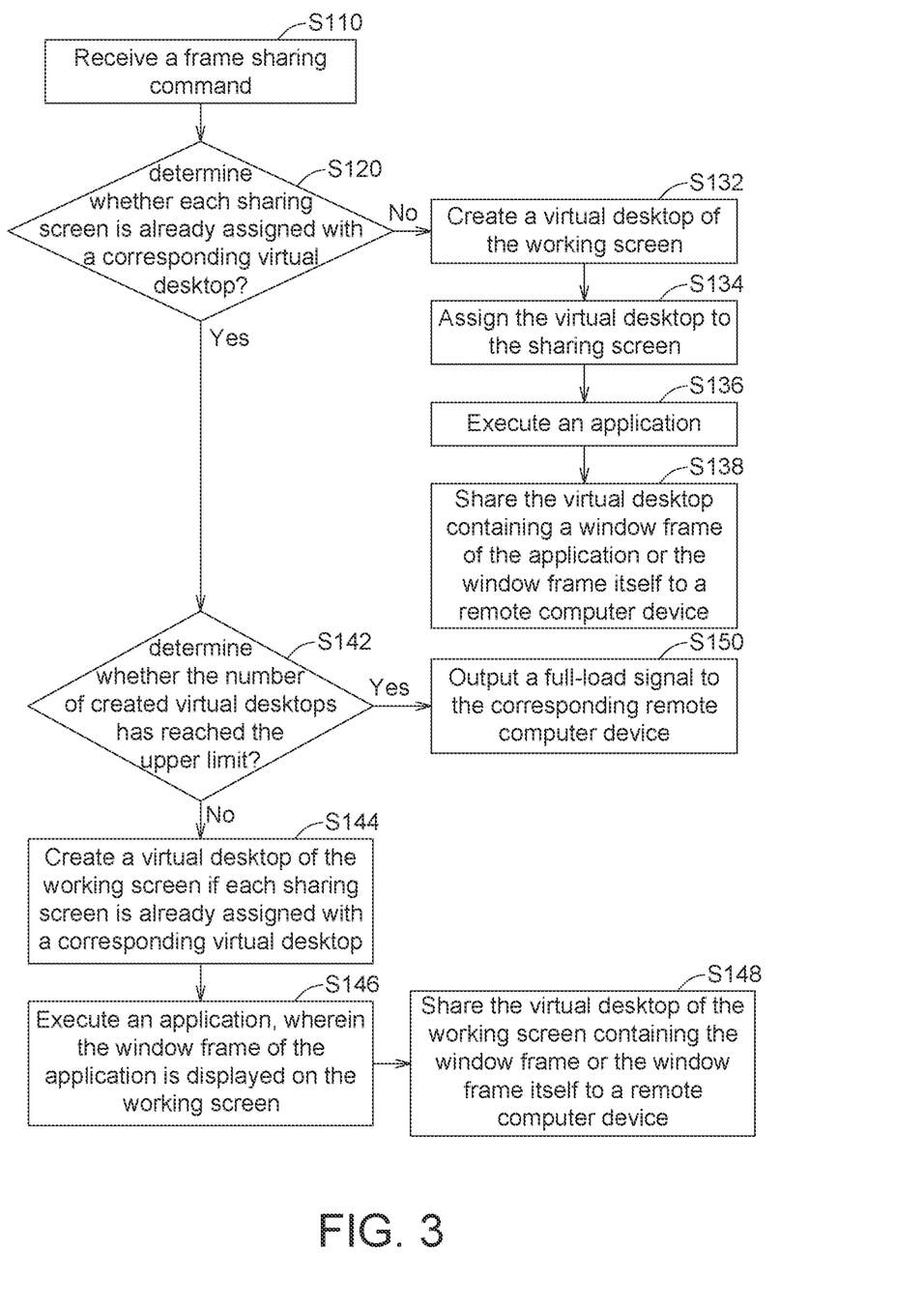
FIG. 3 is a flowchart of a frame sharing method of the electronic device of FIG. 1A.

Refer to FIGS. 3 and 1A to 1B. FIG. 3 is a flowchart of a frame sharing method of the electronic device 100 of FIG. 1A.

In step S110, a frame sharing command is received by an electronic device 100.

Take the frame sharing between the first remote computer device 10A and the electronic device 100 for instance. As indicated in FIGS. 1A to 1B, the first remote computer device 10A transmits a frame sharing command T1 to the processor 120 through the first link L1 to request frame sharing of the electronic device 100. Before the first remote computer device 10A transmits the frame sharing command T1, a first link L1 between the first remote computer device 10A and the communication module 130 can be created beforehand.

In step S120, whether each sharing screen is already assigned with a corresponding virtual desktop is determined by the processor 120. If the determination is negative, the method proceeds to step S132, frame sharing is executed; if the determination is positive, the method proceeds to step S142.

Let the first screen 110A of the electronic device 100 be the working screen and the second screen 110B and the third screen 110C be sharing screens. As indicated in FIGS. 1A to 1B, the processor 120 determines whether the second screen 110B and the third screen 110C both are already assigned with a corresponding virtual desktop (that is, both are shared to a corresponding remote computer device). If the determination is negative, the method proceeds to step S132, frame sharing is executed on the sharing screen not yet assigned with any virtual desktop (that is, the screen is not yet shared to the remote computer device); if the determination is positive, the method proceeds to S142.

In step S132, a virtual desktop of the working screen is created by the processor 120. As indicated in FIGS. 1A to 1B, the processor 120 creates a first virtual desktop VD1 of the first screen 110A.

In step S134, the virtual desktop is assigned to the sharing screen by the processor 120. As indicated in FIGS. 1A to 1B, the processor 120 assigns the first virtual desktop VD1 to the second screen 110B.

In step S136, an application is executed by the processor 120. As indicated in FIGS. 1A to 1B, the processor 120 executes a first application A1.

In step S138, the virtual desktop containing a window frame of the application or the window frame itself is shared to a remote computer device by the processor 120.

As indicated in FIGS. 1A to 1B, the processor 120 shares the first virtual desktop VD1 containing the first window frame F1 of the first application A1 to the first remote computer device 10A or shares the first window frame F1 itself to the first remote computer device 10A.

The frame sharing technology between the second remote computer device 10B and the electronic device 100 is similar to or identical to the frame sharing technology between the first remote computer device 10A and the electronic device 100, and the similarities are not repeated here.

In step S142, whether the number of created virtual desktops has reached the upper limit is determined by the processor 120. If the determination is positive, the method proceeds to step S150; if the determination is negative, the method proceeds to step S144 to S148, frame sharing is executed by the working screen.

In step S144, a virtual desktop of the working screen is created by the processor 120 if each sharing screen is already assigned with a corresponding virtual desktop.

As indicated in FIGS. 1A to 1B, when receiving the frame sharing command T3 from the third remote computer device 10C, the processor 120 determines that the second screen 110B and the third screen 110C (all sharing screens) are already assigned with corresponding virtual desktop but the number of created virtual desktops has not yet reached the upper limit, and new virtual desktop still can be created. Since all sharing screens are executing frame sharing and only the first screen 110A (the working screen) is available for the execution of frame sharing, the processor 120 creates a third virtual desktop VD3 of the first screen 110A.

In step S146, an application is executed by the processor 120, wherein the window frame of the application is displayed on the working screen. As indicated in FIGS. 1A to 1B, the processor 120 executes a third application A3, and the third window frame F3 of the third application A3 is displayed on the first screen 110A.

In step S148, the virtual desktop of the working screen containing the window frame or the window frame itself is shared to a remote computer device by the processor 120. As indicated in FIGS. 1A to 1B, the processor 120 shares the third virtual desktop VD3 of the first screen 110A containing the third window frame F3 or shares the third window frame F3 itself to the third remote computer device 10C.

In step S150, since the number of virtual desktops created by the processor 120 has reached the upper limit and new virtual desktop can no longer be created, a full-load signal S1 is outputted to the corresponding remote computer device by the processor 120 to inform the remote computer device of the message "no more frame sharing".

The frame sharing method of the electronic device 200 of FIG. 2A can include steps S142 to S150 of FIG. 3, and the similarities are not repeated here.

Figure 4:
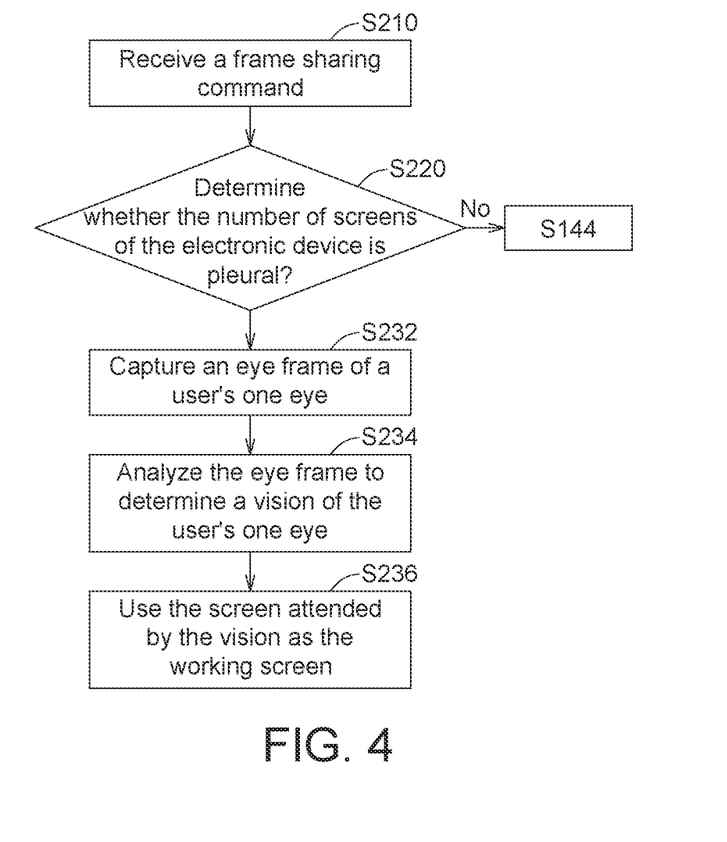
FIG. 4 is a flowchart of another frame sharing method of the electronic device of FIG. 1A.

Refer to FIGS. 4 and 1A to 1B. FIG. 4 is a flowchart of another frame sharing method of the electronic device 100 of FIG. 1A.

In step S210, a frame sharing command is received by the electronic device 100.

Take the frame sharing between the first remote computer device 10A and the electronic device 100 for instance. As indicated in FIGS. 1A to 1B, the first remote computer device 10A transmits a frame sharing command T1 to the processor 120 through the first link L1 to request frame sharing of the electronic device 100. Before the first remote computer device 10A transmits the frame sharing command T1, the first link L1 between the first remote computer device 10A and the communication module 130 can be created beforehand.

In step S220, whether the number of screens of the electronic device 100 is pleural is determined by the processor 120. If the determination is positive, the method proceeds to step S232, one of the pleural screens of the electronic device 100 is determined as the working screen by the processor 120, remaining screens are defined as sharing screens; if the determination is negative, the method proceeds to steps S142 to S150 of FIG. 3 (the frame sharing process of the single-screen electronic device includes steps S142 to S150 of FIG. 3).

In step S232, an eye frame E1 of an eye (or eyes) of the user is captured by the camera 150. For instance, the processor 120 controls the camera 150 to turn on the photo shooting function to capture the eye frame E1 of the user's eye.

In step S234, the eye frame E1 is analyzed by the processor 120 to determine the gaze V1 of the user's eye.

In step S236, the screen attended by the gaze V1 is used as the working screen by the processor 120. For instance, the user is viewing the first screen 110A, the camera 150 captures a corresponding eye frame E1, the processor 120 analyzes the eye frame E1 to obtain the gaze V1 of the user and uses the first screen 110A attended by the gaze V1 as the working screen, uses remaining screens as sharing screens. Using similar methods, the processor 120 can use the second screen 110B attended by the gaze V1 as the working screen or use the third screen 110C attended by the gaze V1 as the working screen.

The frame sharing method of the electronic device 200 of FIG. 2A can include the steps of FIG. 4, and the similarities are not repeated here.

To summarize, an electronic device and a frame sharing method using the same are provided in the embodiments of the present invention. When the electronic device includes several screens, the sharing screen of the electronic device can share the window frame of an application to a remote computer device. Thus, an application can be shared to a remote computer device not installed with the application, the display area of the working screen will not be occupied, and the user's operation of the working screen will not be affected. When the electronic device includes a single screen, the single screen can share the window frame of an application to the remote computer device, so that the application can be shared to a remote computer device not installed with the application. Besides, the electronic device can minimize the window frame of the application on the single screen, so that the window frame does not occupy the display area of the single screen.

While the invention has been described by way of example and in terms of the preferred embodiment (s), it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. An electronic device, comprising:
   a working screen;
   a sharing screen; and
   a processor electrically connected to the working screen and the sharing screen and is configured to:
      create a virtual desktop of the working screen;
      assign the virtual desktop to the sharing screen;
      execute an application; and
      share the virtual desktop containing a window frame of the application to a remote computer device or share the window frame itself to the remote computer device.

2. The electronic device according to claim 1, wherein the processor is further configured to:
   after assigning the virtual desktop to the sharing screen, execute the application on the virtual desktop of the sharing screen, wherein the window frame of the application is displayed on the sharing screen.

3. The electronic device according to claim 1, wherein the processor is further configured to:
   before assigning the virtual desktop to the sharing screen, execute the application on the virtual desktop of the working screen, wherein the window frame of the application is displayed on the working screen.

4. The electronic device according to claim 1, wherein the processor is further configured to:
   after assigning the virtual desktop to the sharing screen, minimize the window frame.

5. The electronic device according to claim 1, wherein the electronic device comprises a plurality of screens and a camera configured to capture an eye frame of an eye of a user; the processor is further configured to:
   analyze the eye frame to determine a gaze of the eye of the user; and
   use the screen attended by the gaze as the working screen.

6. The electronic device according to claim 1, wherein the electronic device comprises a plurality of the sharing screens; the processor is further configured to:
   determine whether each sharing screen has been assigned to the corresponding virtual desktop;
   based on each sharing screen having been assigned to the corresponding virtual desktop, create the virtual desktop of the working screen;
   execute the application, wherein the window frame of the application is displayed on the working screen;
   share the virtual desktop of the working screen containing the window frame to the remote computer device or share the window frame itself to the remote computer device.

7. The electronic device according to claim 1, wherein the processor is further configured to:
   determine whether the number of created virtual desktops has reached an upper limit; and
   based on the number of created virtual desktops having reached the upper limit, output a full-load signal to the remote computer device.

8. An electronic device, comprising:
   a screen; and
   a processor electrically connected to the screen and is configured to:
      create a virtual desktop of the screen;
      execute an application; and share the virtual desktop containing a window frame of the application to a remote computer device or share the window frame itself to the remote computer device.

9. The electronic device according to claim 8, wherein the processor is further configured to:
after sharing the virtual desktop containing the window frame of the application to the remote computer device or share the window frame itself to the remote computer device, minimize the window frame.

10. The electronic device according to claim 8, wherein the processor is further configured to:
determine whether the number of created virtual desktops has reached an upper limit; and
based on the number of created virtual desktops having reached the upper limit, output a full-load signal to the remote computer device.

11. A frame sharing method adaptable to an electronic device, the electronic device comprises a working screen, a sharing screen and a processor, and the frame sharing method comprises:
creating a virtual desktop of a working screen by the processor;
assigning the virtual desktop to the sharing screen by the processor
executing the application by the processor; and
sharing the virtual desktop containing the window frame of the application to a remote computer device or sharing the window frame itself to the remote computer device by the processor.

12. The frame sharing method according to claim 11, further comprising:
after assigning the virtual desktop to the sharing screen, executing the application on the virtual desktop of the sharing screen by the processor, wherein the window frame of the application is displayed on the sharing screen.

13. The frame sharing method according to claim 11, further comprising:
before assigning the virtual desktop to the sharing screen, executing the application on the virtual desktop of the working screen by the processor, wherein the window frame of the application is displayed on the working screen.

14. The frame sharing method according to claim 11, further comprising:
after assigning the virtual desktop to the sharing screen, minimizing the window frame by the processor.

15. The frame sharing method according to claim 11, wherein the electronic device further comprises a plurality of screens and a camera, and the frame sharing method further comprises:
capturing an eye frame of an eye of a user by the camera;
analyzing the eye frame by the processor to determine a gaze of the eye of the user; and
using the screen attended by the gaze as the working screen by the processor.

16. The frame sharing method according to claim 11, wherein the electronic device comprises a plurality of sharing screens; the frame sharing method further comprises:
determining by the processor whether each sharing screen has been assigned to the corresponding virtual desktop;
if each sharing screen has been assigned to the corresponding virtual desktop, creating the virtual desktop of the working screen by the processor;
in response to an application execution command, displaying the window frame of the application on the working screen by the processor;
sharing the virtual desktop of the working screen containing the window frame to the remote computer device or sharing the window frame itself to the remote computer device by the processor.

17. The frame sharing method according to claim 11, further comprising:
determining by the processor whether the number of created virtual desktops has reached an upper limit; and
if the number of created virtual desktops has reached the upper limit, outputting a full-load signal to the remote computer device by the processor.

18. A frame sharing method adaptable to an electronic device, wherein the electronic device comprises a screen and a processor, and the frame sharing method comprises:
creating a virtual desktop of the screen by the processor;
executing an application by the processor; and
sharing the virtual desktop containing a window frame of the application to a remote computer device or sharing the window frame itself to the remote computer device by the processor.

19. The frame sharing method according to claim 18, further comprising:
after sharing the virtual desktop containing the window frame of the application to the remote computer device or sharing the window frame itself to the remote computer device, minimizing the window frame by the processor.

20. The frame sharing method according to claim 18, further comprising:
determining by the processor whether the number of created virtual desktops has reached an upper limit; and
if the number of created virtual desktops has reached the upper limit, outputting a full-load signal to the remote computer device by the processor.

* * * * *